United States Patent [19]
Kaneko et al.

[11] 3,933,369
[45] Jan. 20, 1976

[54] SAFETY BELT DEVICES FOR VEHICLES
[75] Inventors: Yuichiro Kaneko; Fuminori Teraoka; Tatsushi Kubota; Takehiko Nishikawa, all of Aichi, Japan
[73] Assignee: Kabushiki Kaisha Tokai Rika Denki Seisakusho, Japan
[22] Filed: Oct. 30, 1972
[21] Appl. No.: 301,796

[30] Foreign Application Priority Data
Nov. 4, 1971 Japan.............................. 46-87868

[52] U.S. Cl............................................. 280/150 SB
[51] Int. Cl.²........................................... B60R 21/10
[58] Field of Search...... 280/150 SB; 180/82 C, 112

[56] References Cited
UNITED STATES PATENTS
3,680,883  8/1972  Keppel ........................ 280/150 SB
3,684,310  8/1972  Weststrate..................... 280/150 SB
3,770,078  11/1973 Keppel et al. ................. 280/150 SB Primary Examiner—Robert R. Song
Attorney, Agent, or Firm—Stevens, Davis, Miller & Mosher

[57] ABSTRACT

A safety belt device for use in vehicles, having at least one belt extending across the body of a passenger sitting on a seat, in which the belt is held in a disengaging position forwardly of the seat irrespective of the door opening and closing operation when the passenger is not sitting on the seat, providing for the passenger to get into the vehicle, and is placed in an engaging position when the passenger has sat down on the seat and closed the door, restraining the body of the passenger, and is retracted to the disengaging position when the passenger sitting on the seat has opened the door providing for alighting of the passenger from the vehicle.

5 Claims, 11 Drawing Figures

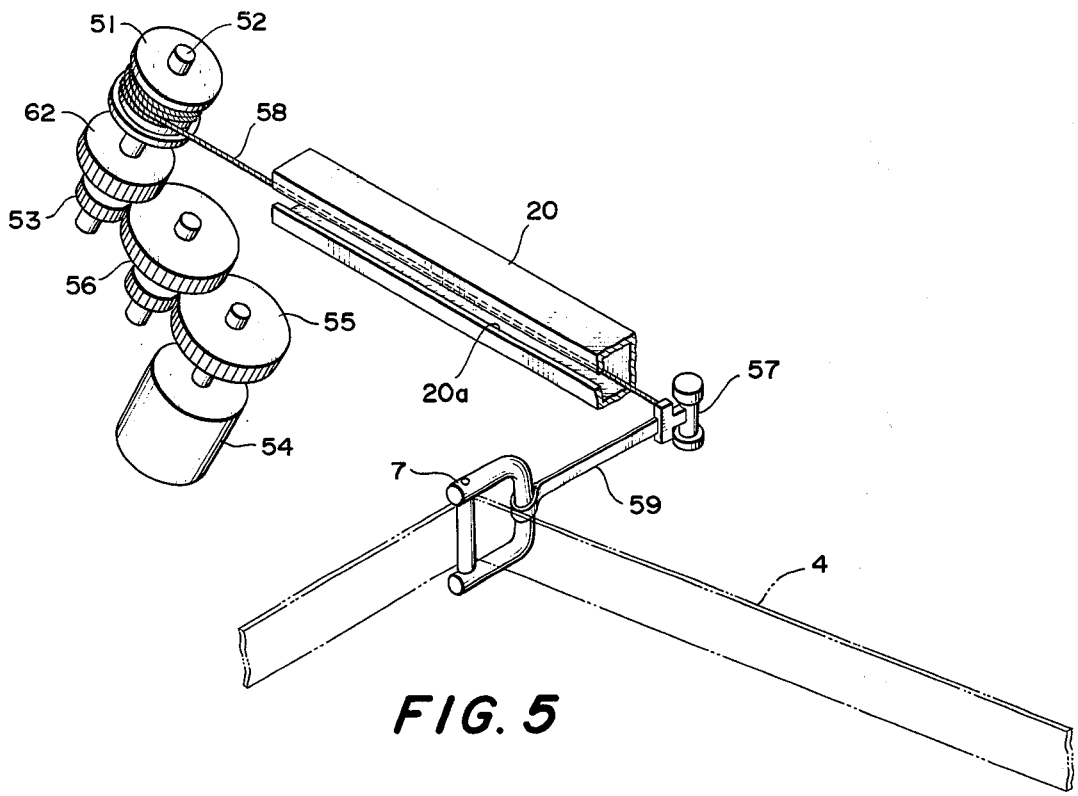
FIG. 5
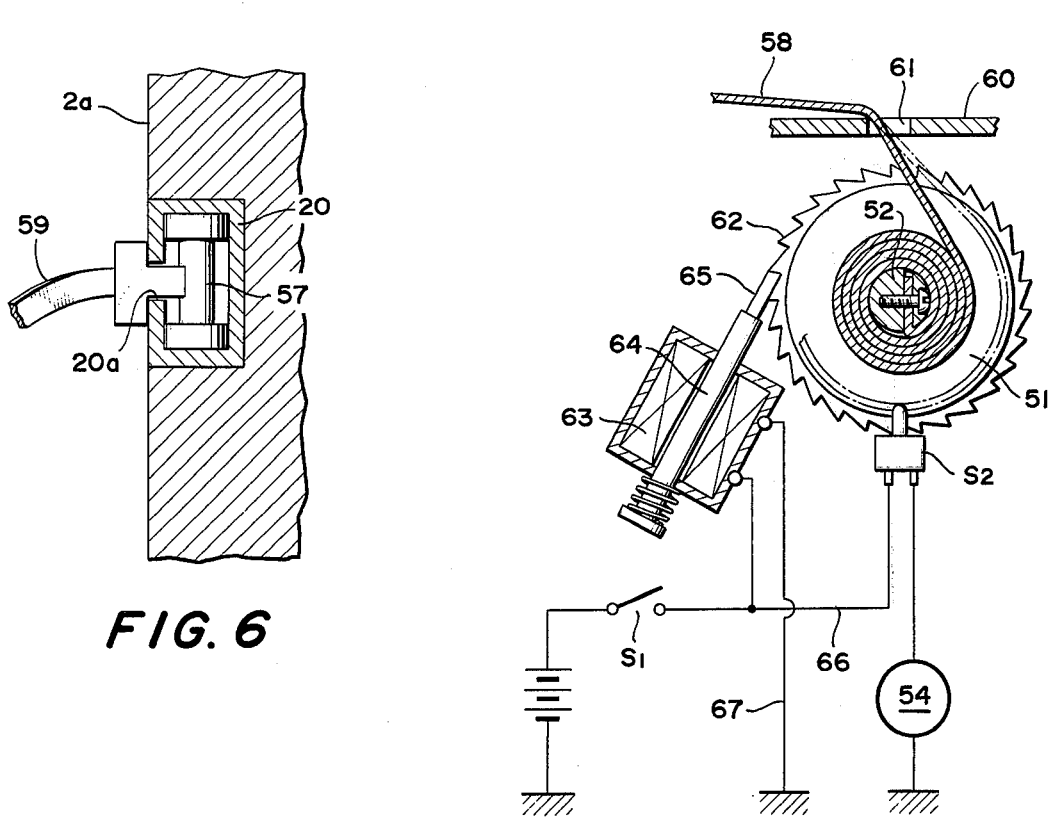
FIG. 6
FIG. 7

SAFETY BELT DEVICES FOR VEHICLES

This invention relates to a safety belt device for use in vehicles.

An object of the present invention is to provide a safety belt device which is so designed that a belt is automatically released and tightly engaged around the body of a passenger when the passenger has sat down on a seat and closed the adjacent door of the vehicle.

Another object of the invention is to provide a safety belt device of the character described, in which the belt is held in a disengaging position forwardly of the seat when the passenger is not sitting on the seat, so as not to interfere with the passenger sitting on the seat.

Still another object of the invention is to provide a safety belt device of the character described, in which the belt is automatically retracted to the disengaging position when the passenger has opened the door to get out of the vehicle, releasing the passenger from restraint and allowing the passenger to get off the vehicle.

The safety belt device according to the present invention has at least one belt extending across the body of a passenger sitting on a seat, with one end thereof anchored to a retractor provided on the inner surface of a door at a location opposite to the outer side of the seat and the other end anchored to the inner side of the seat or to the body of the vehicle adjacent the inner side of the seat, or alternatively with one end thereof anchored to the inner side of the door and the other end anchored to a retractor provided on the inner side of the seat or on the body of the vehicle adjacent the inner side of the seat, in a way to restrain the waist portion of the passenger when the door is closed, and a drawing belt or wire provided at the forward portion of the inner side of the door, with one end thereof connected to said belt and the other end anchored to winding means driven by a motor in timed relation to the door opening operation or an operation preparatory for opening the door, for withdrawing the belt from said retractor and placing the same in the disengaging position incident to the door opening operation.

The present invention will be described in further detail hereunder with reference to the accompanying drawings.

FIGS. 5 to 7 are views showing still another embodiment of the safety belt device of the invention, of which FIG. 5 is a perspective view of the essential portion of the device; FIG. 6 is a sectional side view of the mechanism shown in FIG. 5; and FIG. 7 is a plan view of the mechanism shown in FIG. 5;

Figure 8:
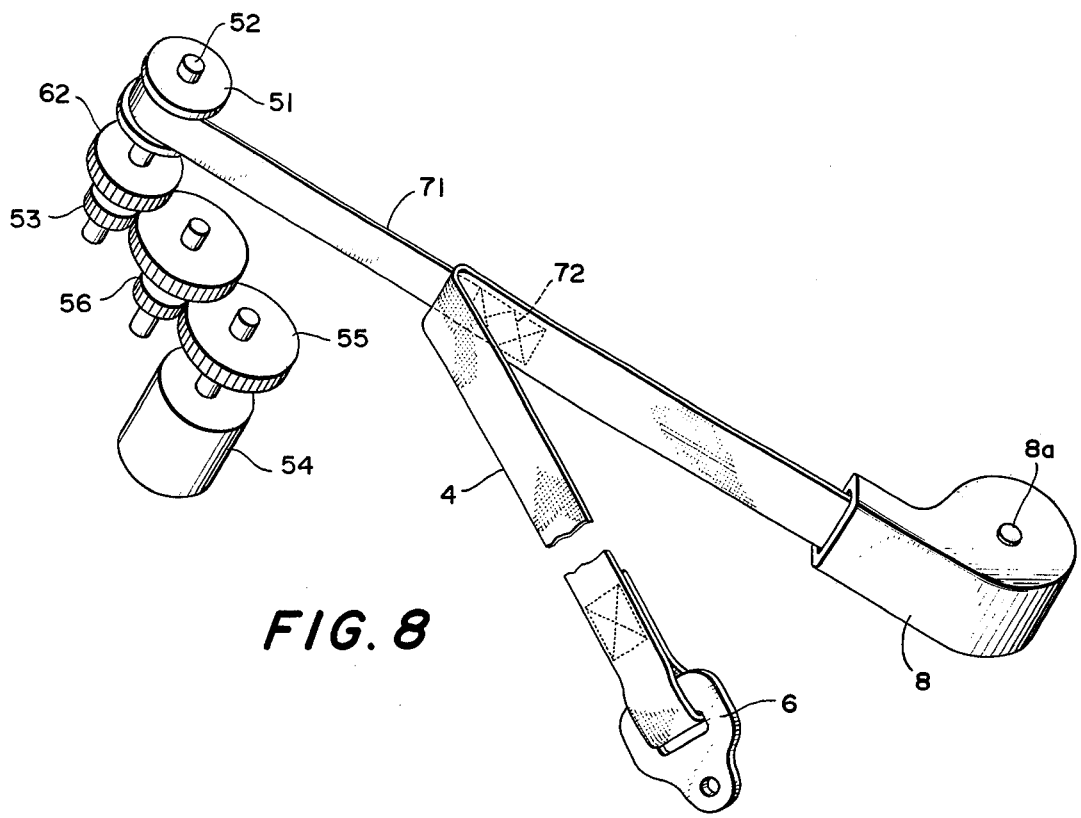
Figure 9:
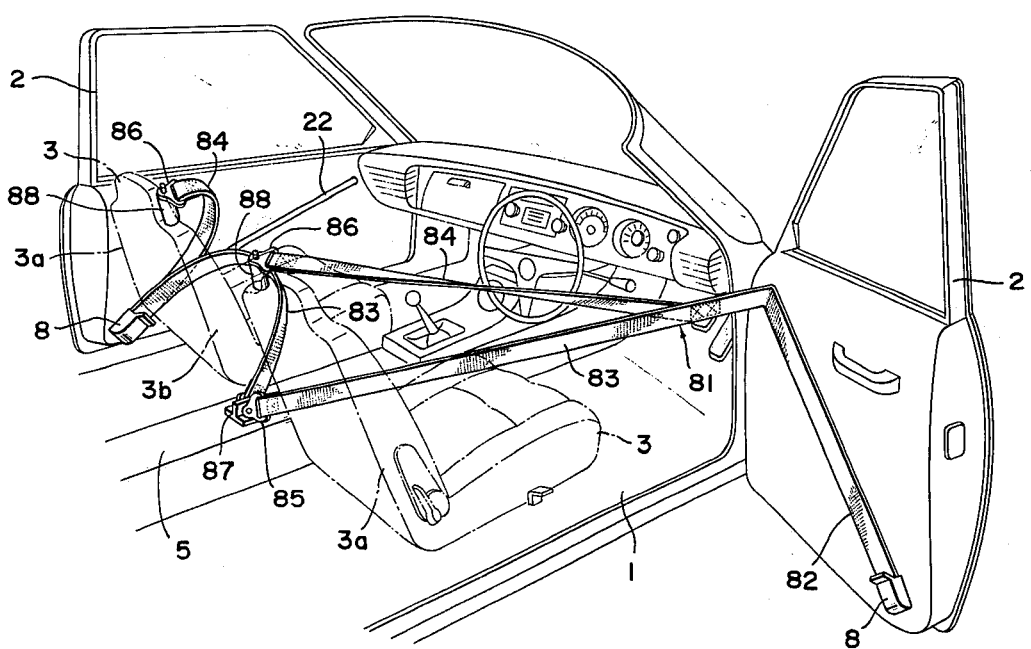
Figure 10:
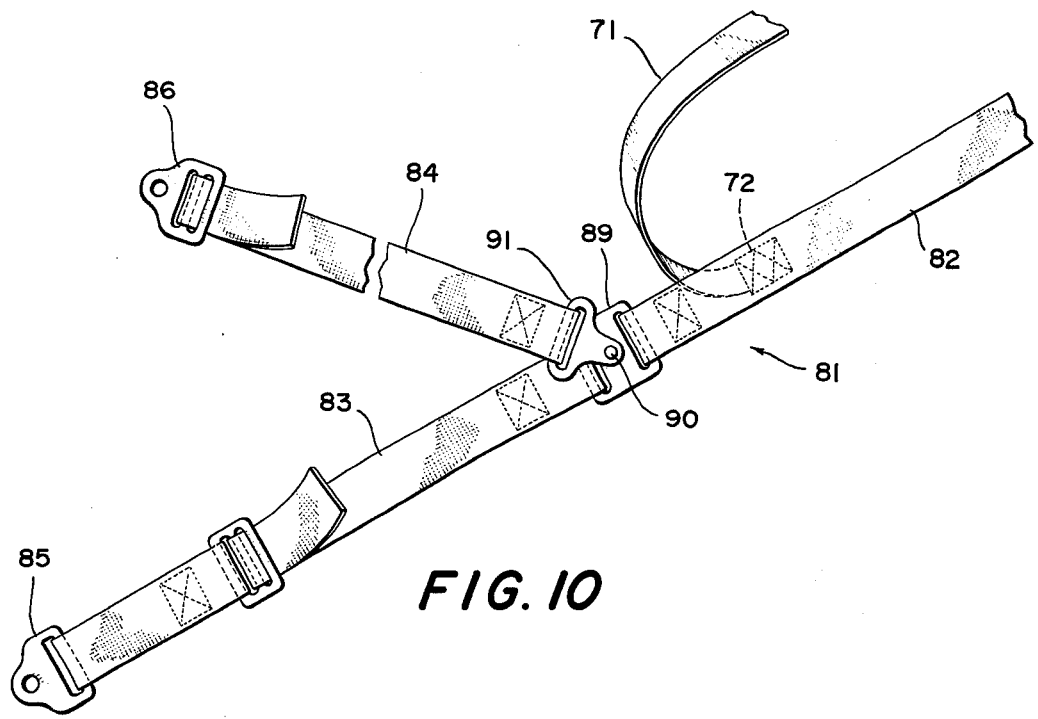
Figure 11:
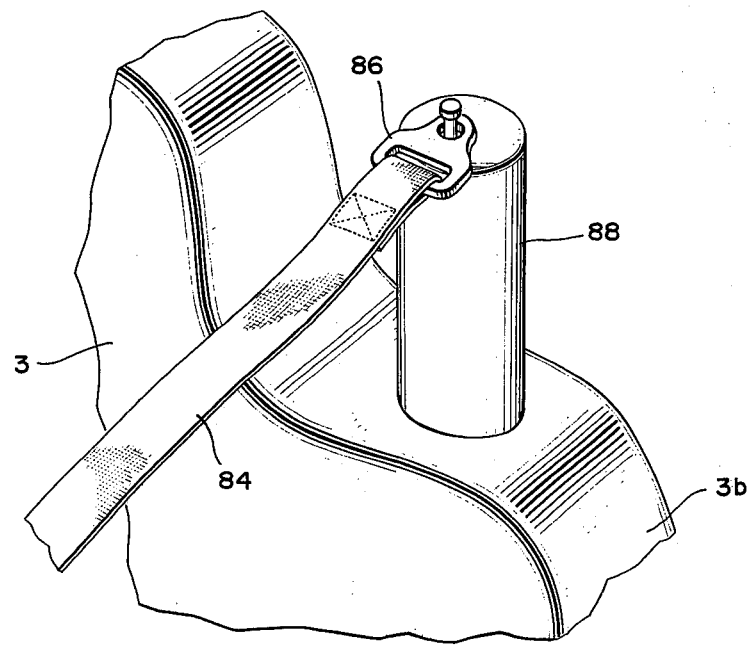

FIG. 8 is a perspective view of a still another embodiment of the safety belt device of the invention, showing a drawing belt operating mechanism; and FIGS. 9 to 11 show a further embodiment of the safety belt device of the invention, of which FIG. 9 is a perspective view of the essential portion; FIG. 10 is a perspective view of the three-point belt; and FIG. 11 is an illustrative view showing the connection between a short pole and an anchor.

Figure 1:
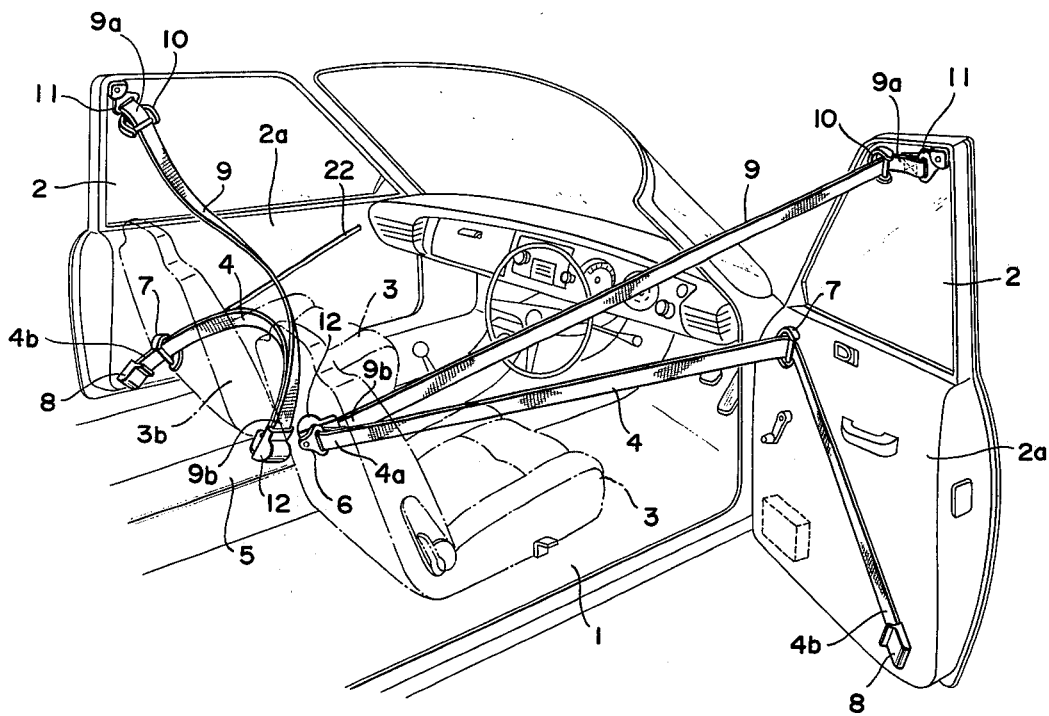
FIG. 1 is a fragmentary perspective view of a vehicle equipped with the safety belt device of the invention; a door adjacent the driver's seat being left opened after alighting of the driver and a door adjacent the assistant driver's seat being held closed after a passenger has sat down on the seat.

The first embodiment of the invention will be described with reference to FIGS. 1 – 3. In FIG. 1, reference numeral 1 designates the body of an automobile, 2 doors and 3 seats. A waist belt 4 has one end 4a anchored to an anchor plate 6 fixed to the central portion 5 of the automobile body, with the other end 4b thereof extending through a guide ring 7 and anchored to a retractor 8 provided at the lower portion of the door 2. The retractor 8 is of a known type which is so constructed as to lock the belt automatically against withdrawal therefrom when the automobile undergoes a positive or negative acceleration as in the case of a head-on collision or rear-end collision. A shoulder belt 9 is extending obliquely across the chest portion of a passenger, with one end 9a anchored to an anchor plate 11 fixed to the upper portion of the door 2 after passing through a guide ring 10, with the other end 9b thereof anchored to a retractor 12 fixed to the central portion 5 of the automobile body.

Figure 2:
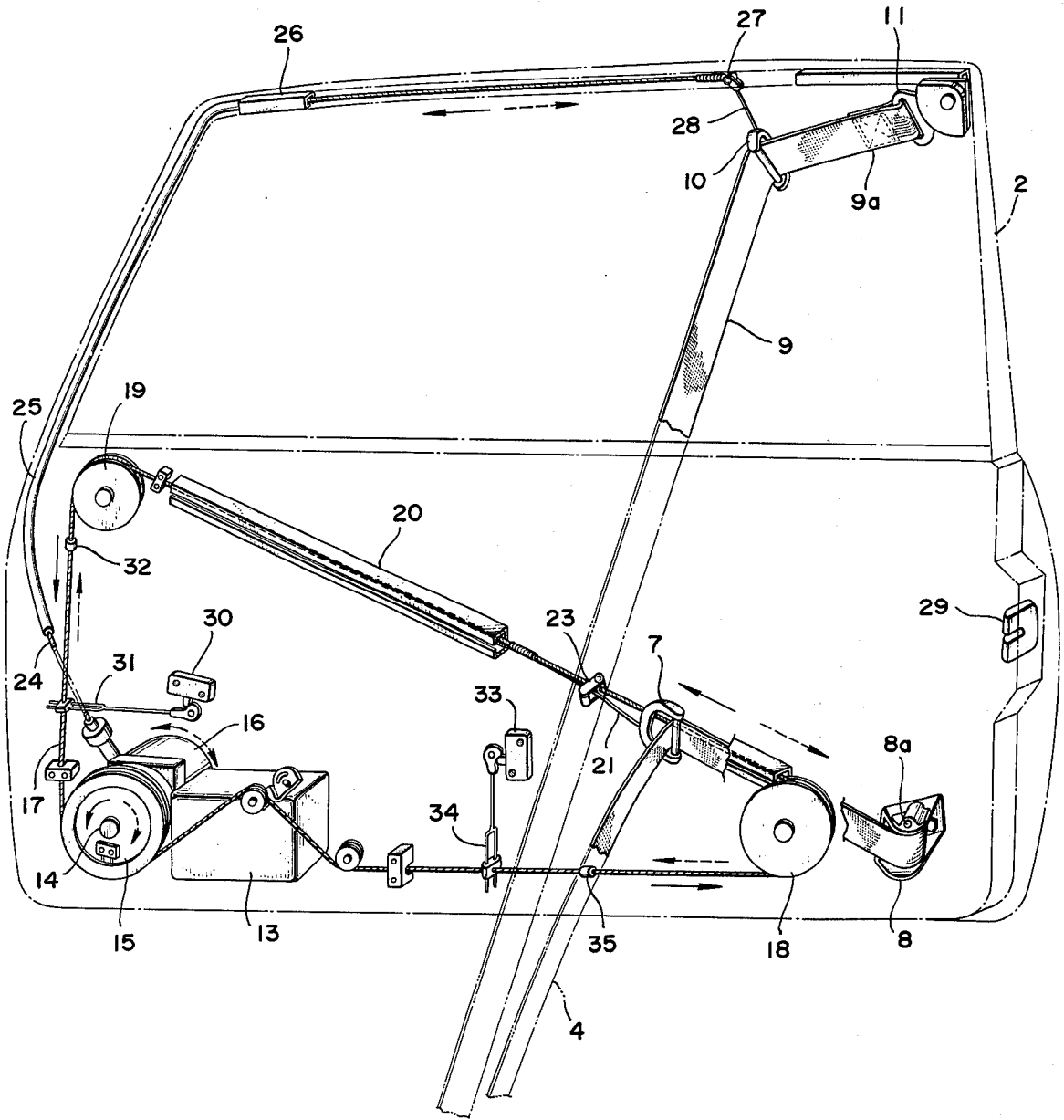
FIG. 2 is a front view of a guide ring shifting mechanism provided on the inner side of the door.

FIG. 2 shows a mechanism for shifting the waist belt guide ring 7 and the shoulder belt guide ring 10, which is arranged in the inside of the door 2 upon removing an inner lining 2a of said door. As shown, a drive shaft 14 of a motor 13 which is rotatable in one or the other direction, has a pulley drum 15 mounted on one end and a cup ring 16 mounted on the other end thereof. A wire 17 is engaged around the pulley drum 15 and two other pulley drums 18, 19. The pulley drum 18 is located adjacent the retractor 8 and the pulley drum 19 is located in a position slanting upwardly of said retractor 8. A substantially C-shaped guide rail 20 is provided between the pulley drums 18 and 19 along the wire 17, extending slantingly upwardly from the inner lower portion of the door, and the waist belt guide ring 7 having the waist belt 4 loosely passing therethrough is connected by means of a string 21 to a suitable location of the wire 17 extending in said guide rail 20. A slit 22 is formed in the inner lining 2a of the door 2 along the guide rail 20 (see FIG. 1). In order to prevent an oscillatory movement of the waist belt guide ring 7, the string 21 is passed through an oscillation preventive ring 23 which is loosely received in the guide rail 20 and fixed to the wire 17 adjacent the waist belt guide ring 7. A plastic wire 24 having one end anchored to the coupling ring 16 to be wound therearound is passed in an outer tube 25 embedded in a door framework and also in a guide rail 26 provided at the upper end portion of the door framework 2, and connected at the other end to the shoulder belt guide ring 10 having the shoulder belt 9 loosely passing therethrough, through a roller 27 and a string 28. Reference numeral 29 designates a door switch incorporated in a door lock for controlling the direction of rotation of the motor 13, and 30 designates a stop switch for controlling the motor 13. An actuator 31 is provided in engagement with the stop switch 30, which is formed therein with an opening which is larger in diameter than the wire 17 to provide for free movement of the wire therein. A stopper 32 is fixed to a suitable location of the length of the wire 17 between the pulley drum 19 and the actuator 31, which will be carried by the wire into abutment against the actuator 31 when said wire is shifted to a position to completely raise the waist belt 4 and shoulder belt 9, thereby to actuate the stop switch 30. Reference numeral 33 designates another stop switch similar to the stop switch 30, which will be actuated by an actuator 34 in contact therewith. A stopper 35 is fixed to a suitable location of the length of the wire 17 between the pulley drum 18 and the actuator 34. This stopper 35 will be carried by the wire into abutment against the actuator 34 when said wire is shifted to a position to completely lower the belts 4 and 9, thereby to actuate the stop swith 33. In FIG. 2, the solid line arrows indicate a belt raising direction and the dotted line arrows indicate a belt lowering direction.

Figure 3:
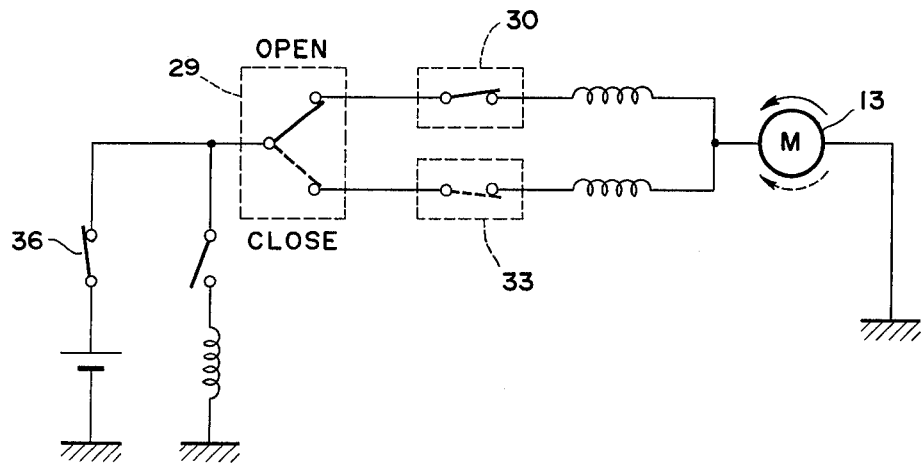
FIG. 3 is a wiring circuit diagram of the safety belt device.

Referring to FIG. 3, there is shown an electric circuit of the safety belt device, including the door switch 29, the stop switches 30, 33, the motor 13 and a seat switch 36 which is provided below the seat 3 and will be actuated to close a motor driving circuit when a passenger sits down on the seat.

The safety belt device of the construction described above will operate in the following manner: Namely, when the door 2 is open, the guide rings 7 and 10 for the waist belt 4 and shoulder belt 9 are located adjacent the door hinge and, therefore, said belts will not interfere with the passenger getting on the automobile. When the passenger has got on the automobile and sat down on the seat, the seat switch 36 is switched on but the guide rings 7, 10 are still immovably held in their positions respectively. Now, when the door 2 is closed in this state, the door switch 29 is switched on and the motor 13 is driven in a reverse direction as indicated by the dotted line arrow. The guide ring 7 connected to the wire engaged around the pulley drums 15, 18, 19 moves along the guide rail 20 by being carried by said wire, toward the lower portion of the door 2. At the same time, the plastic wire 24 wound on the cup ring 16, mounted on the drive shaft 14 of the motor 13, is forcibly paid out therefrom, so that the guide ring 10 is carried by said wire and the shoulder belt 9 is raised by said guide ring 10. When the stopper 35 fixed to the wire 17 is brought into abutment against the actuator 34, the stop switch 33 is switched off and thus the motor 13 is stopped. The excess portions of the belts 4, 9 are taken up by the respective retractors 8, 12. Thus, the body of the passenger is restrained by the waist belt 4 and the shoulder belt 9. Now, the operation of the device in the event when the passenger gets off the automobile will be described. When the passenger pulls a handle inside the door, 2, the door switch 29 is actuated, with the result that the motor 13 rotates in the normal direction as indicated by the solid line arrow and the guide rings 7, 10 are shifted to their original positions, so that the belts 4, 9 release the passenger from restraint. Thus, the passenger can get off the automobile without being interfered by the belts 4, 9. When the stopper 32 fixed to the wire 17 is brought into abutment against the actuator 31, the stop switch 30 is turned off to stop the motor 13. Now, when the passenger closes the door after getting off the automobile, the door switch 29 is actuated but the seat switch 36 is in its off-position, so that the belts 4, 9 are immovably held in their disengaging positions.

Figure 4:
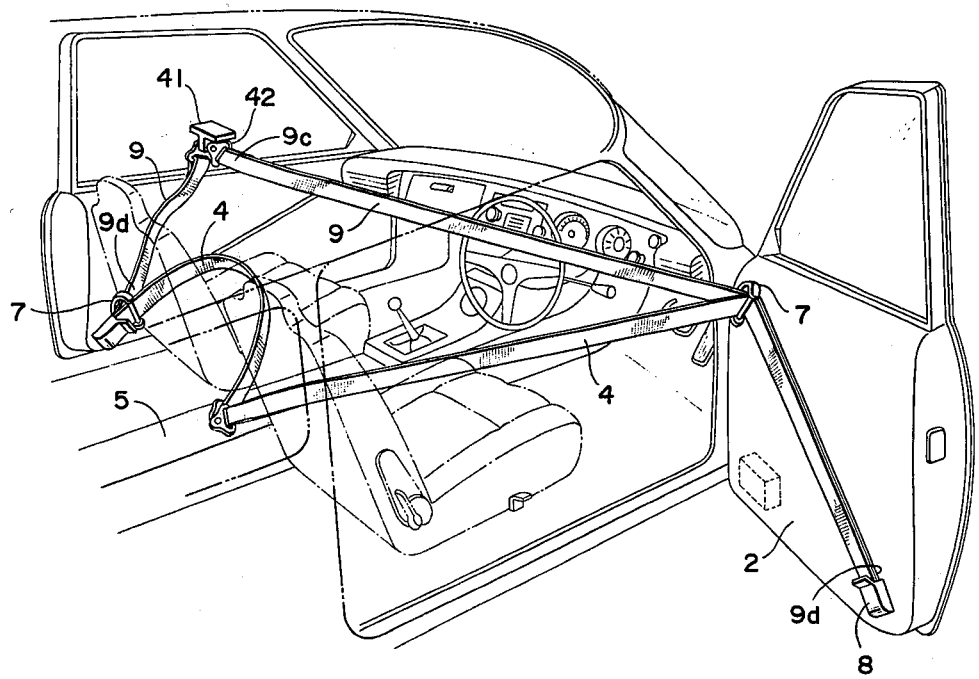
FIG. 4 is a fragmentary perspective view of a vehicle equipped with another embodiment of the safety belt device of the invention.

FIG. 4 shows another embodiment of the safety belt device accordiing to the invention. In this embodiment, the waist belt 4 is connected in the same manner as in the preceding embodiment shown in FIG. 1 but the shoulder belt 9 has one end 9c anchored to an anchor plate 42 which is fixed to an anchor element 41 provided centrally of the automobile roof, with the other end 9d connected to the retractor 8 for the waist belt 4, after passing the waist belt guide ring 7. Namely, the waist belt 4 and shoulder belt 9 are loosely passed through the waist belt guide ring 7 and connected to the retractor 8 to be taken up thereby. Therefore, according to this embodiment, the cup ring 16, the plastic wire 24, the outer tube 25, the guide rail 26, the roller 27, the string 28, the shoulder belt guide ring 10 and the anchor plate 11, shown in FIG. 2 become unnecessary. In the operation of this embodiment, the raising and lowering of the waist belt 4 and shoulder belt 9 are effected by the waist belt guide ring 7 which is shifted as described in the preceding embodiment.

It is to be understood that, in the first and second embodiments described above, the shoulder belt 9 and the means for operating the same may be removed when it is desired to use only the waist belt 4.

The third embodiment of the invention will be described with reference to FIGS. 5 – 7. This embodiment is a modification of the first embodiment shown in FIG. 2, in which the waist belt 4 only is used which is operated by a different form of belt driving mechanism. According to this embodiment, a winding reel 51 is disposed at the position of the pulley drum 19 in FIG. 2, and a gear 53 is fixedly mounted on a shaft 52 of said reel 51, substantially parallel to the shaft 8a of the retractor 8 (see FIG. 2), and further a reduction gearing 56 is interposed between the gear 53 and a drive gear 55 of a motor 54, to constitute a driving mechanism. All of the motor 54, the reduction gearing 56 and the winding reel 51 are disposed inside the inner lining 2a of the door 2. A driving circuit 66 for the motor 54 is arranged such that the motor is set in motion by a door switch $S_1$ which will be closed when the door 2 is slightly opened, and is stopped by a switch $S_2$ which will be opened when the diameter of a winding of a wire 58 on the winding reel 51 increases and reaches a predetermined value. A ratchet wheel 62 is fixedly mounted on the shaft 52 of the winding reel 51, while a ratchet pawl 62 for preventing reverse rotation of said shaft 52 by engagment with said ratchet wheel 62 is formed on a plunger 64 operated by a solenoid 63. The aforesaid door switch $S_1$ is incorporated in an exciting circuit 67 for the solenoid 63, as shown in FIG. 7.

This embodiment operates in the following manner:

Namely, when the passenger sitting on the seat 3 closes the door 2, the door switch $S_1$ and hence the exciting circuit 67 for the solenoid 63 are opened, with the result that the shaft 52 of the winding pulley 51 is released from restraint against reverse rotation by the ratchet pawl 65, and thus the belt 4 is retracted automatically be the winding shaft 8a of the retractor 8 while unwinding the wire 58 from the winding reel 51. Therefore, the belt 4 is stretched taut, extending from the anchor plate 6 around the belly portion of the passenger and thus restraining the body of the passenger in cooperation with the seat 3. Namely, the belt 4 is placed in its engaging position (see the left side seat 3 and the belt 4 in FIG. 1).

With the belt 4 being in its engaging position, when the door 4 is slightly opened, the door switch $S_1$ is opened and the switch $S_2$ is also opened which has previously been closed as a result of unwinding of the wire 58, so that the driving circuit 66 is closed and the exciting circuit 67 is also closed. As a result, the motor 54 is set in motion and concurrently the solenoid 63 is excited, and the winding reel 51 driven at a slow speed by the motor 54 winds up the wire 58 while withdrawing the belt 4 from the winding shaft 8a of the retractor 8 through said wire against the biasing force of a spring acting on said winding shaft 8a. At the same time, the ratchet pawl 65 engages the ratchet wheel 62 to prevent reverse rotation of the shaft 52. Thus, the belt 4 is drawn upwardly by the guide ring 7 and cleared from the body of the passenger. Namely, the belt 4 is placed in its disengaging position. The switch $S_2$ is opened at the same time when the diameter of the winding of wire 58 on the winding reel 51 has increased and reached the predetermined value, so that the driving circuit 66 is opened and the motor 54 stops its rotation. The belt 4 is held in its disengaged position because the shaft 52 is held against reverse rotation by the ratchet pawl 65. When the door 2 is further opened to its full open position like the right side door shown in FIG. 1, the retractor 8 is also moved away from the way of the passenger, so that the passenger can get off the automobile without being interfered by the belt 4.

Next, the fourth embodiment of the invention will be described with reference to FIG. 8. This embodiment is a modification of the third embodiment, in which a drawing belt 71 is used in lieu of the guide rail 20, the oscillation preventive ring 57, the wire 58, the flexible connecting member 59 and the waist belt guide ring 7, shown in FIG. 5. One end of the drawing belt 71 is fixedly connected to the most suitable location of the belt 4 by sewing and the other end thereof is secured to the winding reel 51.

It should be understood that, in the first to fourth embodiments described above, the mounting positions of the retractor 8 and the anchor plate 6 may be changed to each other.

FIGS. 9 – 11 show the fifth embodiment of the invention. This embodiment comprises a shoulder belt added to the third and fourth embodiment. Namely, a belt 81 consists of a three point belt composed of a waist belt 83 and a shoulder belt 84, which are branched from a common belt 82. The free end of the common belt 82 is secured to the winding shaft 8a of the retractor 8 provided on the inner side of the associated door 2. The free end of the waist belt 83 is provided with an anchor 85 and connected to a hook 87, fixed to the central portion 5 of the automobile body, by way of said anchor 85, while the free end of the shoulder belt 84 is provided with an anchor 86 and connected to an upright short pole 88, fixed to the inner portion of the backside of the seat 3 (see FIG. 11), by way of said anchor 86. The construction of the three point belt is variable widely but an example thereof is shown in FIG. 10. In this example, the common belt 82 and the waist belt 83 are connected with each other by means of a coupler 89, and the shoulder belt 84 is connected to said coupler 89 through a coupler 91 which is pivotably connected to said coupler 89 by means of a pin 90. The anchors 85, 86 are of a type which provides for free adjustment of the lengths of the waist belt 83 and shoulder belt 84.

The other construction of this embodiment is the same as that of the fourth embodiment. Namely, a drawing belt 71 is fixed to the common belt 82 by sewing as at 72 and a mechanism for winding said drawing belt 71 on the winding reel 51 (though not apparent in FIGS. 9 – 11) concurrently with opening of the door 2 is the same as that of the third and fourth embodiments shown in FIGS. 6 and 7.

The function of the common belt 82 and waist belt 83 of the three point belt 81 are the same as that of the belt 6 in the third and fourth embodiments. Namely, when the door 2 is closed, the common belt 82 is concurrently retracted into the retractor 8 and the waist belt 83 is placed in its engaging position extending around the belly and waist portion of the passenger, whereas when the door 2 is opened, the common belt 82 is withdrawn from the retractor 8 by the drawing belt 71 and the waist belt 83 is cleared from the seat and simultaneously the retractor 8 is moved away with the door from the way of the passenger. The shoulder belt 84 connected to the common belt 82 is placed in its engaging position around the shoulder of the passenger, at the same time when the waist belt 83 is placed in its engaging position (see the left side shoulder belt in FIG. 9), and is placed in its disengaging position at the same time when the waist belt is placed in its disengaging position (see the right side shoulder belt in FIG. 9).

It should be understood that, in the first to fifth embodiments, while the waist belt 4, 83 is connected to the central portion 5 of the automobile body, it may alternatively be connected to the inside portion 3b of the seat 3.

As may be understood from the foregoing description, the safety belt devices of the invention are so constructed and operative that the belt is automatically placed in the engaging position to restrain the body of the passenger, by the door opening and closing operation and, therefore, with the safety belt device of the invention, the inadvertent failure in tightening the belt or the cumbersomeness of a belt tightening operation can be eliminated. Further, the safety belt device of the invention is so designed that the belt is shifted by the door opening and closing operation, only when the seat switch is in its closed position, so that an unnecessary movement of the belt can be avoided, and the belt is cleared forwardly from the seat when the passenger gets into or out of the automobile, so that it does not interfere with the passenger getting on or off the automobile at all.

What is claimed is:

1. A safety belt device for vehicles, comprising: a first safety belt retractor provided on the inner surface of a door of a vehicle at a location opposite the outer side of a seat adjacent said door; a second safety belt retractor fixed to the central portion of a vehicle body; a first safety belt having one end connected to said first retractor and extending from said first retractor across said seat with the other end thereof secured to the inner side of the seat; a second safety belt having one end connected to said second retractor and extending obliquely from said second retractor across the chest portion of a passenger with the other end thereof secured to the upper portion of a door framework of the vehicle; and a belt driving mechanism wholly positioned in a portion of the door and including a motor which drives a pulley drum and a cup ring, a first drawing member connected to said first safety belt and moved by said motor around said pulley drum and two other pulley drums spaced apart from each other, a second drawing member connected to said second safety belt and moved by said motor around said cup ring and along the door framework of the vehicle at the same time said first drawing member is moved, a door switch incorporated in a door lock for controlling the direction of rotation of said motor, a seat switch provided below the seat and actuated to close a motor driving circuit when a passenger sits down on the seat, a first stop swich for controlling said motor in cooperation with a first actuator and a first stopper which is fixed to said first drawing member at a predetermined location between one of said two other pulley drums and said first actuator, and a second stop switch for controlling said motor in cooperation with a second actuator and a second stopper which is fixed to said first drawing member at a predetermined location between the other of said two other pulley drums and said second actuator, and said motor being set in motion by said door switch in timed relation with a door opening operation, whereby when the door is closed, said first safety belt and said second safety belt are retracted into said first retractor and said second retractor, respectively, and placed in their engaging position to restrain the waist and the chest portions of a passenger sitting on the seat.

2. A safety belt device for vehicles as defined in claim 1, in which said first safety belt comprises a waist belt and said second safety belt comprises a shoulder belt.

3. A safety belt device for vehicles as defined in claim 1, in which said first drawing member extends partially in a first guide rail and said second drawing member extends partially in a second guide rail.

4. A safety belt device for vehicles as defined in claim 1, wherein said first drawing member and said second drawing member comprise belts.

5. A safety belt device for vehicles as defined in claim 1, wherein said first drawing member and said second drawing member comprise wires.

* * * * *